United States Patent [19]
Faulk

[11] Patent Number: 5,751,565
[45] Date of Patent: May 12, 1998

[54] CONTROLLING PULSE SKIP MODULATION IN POWER CONVERSION

[75] Inventor: Richard A. Faulk, Cypress, Tex.

[73] Assignee: Compaq Computer Corporation, Houston, Tex.

[21] Appl. No.: 707,697

[22] Filed: Sep. 4, 1996

[51] Int. Cl.$^6$ .............. H02M 7/00; H02M 3/335
[52] U.S. Cl. .................. 363/41; 363/97; 363/98; 363/21
[58] Field of Search .............. 363/41, 17, 21, 363/97, 98

[56] References Cited

U.S. PATENT DOCUMENTS

| | | | |
|---|---|---|---|
| 4,322,786 | 3/1982 | Weber | 363/21 |
| 4,355,277 | 10/1982 | Davis et al. | 363/21 |
| 5,077,652 | 12/1991 | Faley | 363/97 |
| 5,498,995 | 3/1996 | Szepesi et al. | 363/21 |
| 5,499,184 | 3/1996 | Squibb | 363/21 |

OTHER PUBLICATIONS

Locascio et al., "A new PWM controller IC for battery powered systems," in Technical Papers of the Eighth International High Frequency Power Conversion Conference pp. 81–93 (1993).

Jeffrey H. Hwang, Micro Linear Corporation, "ML482X: Green Mode Power Conservation," presented Jun. 29, 1994, at Compaq Computer Corporation facilities in Houston, Texas (15 viewgraphs).

K. Kit Sum, *Switch Mode Power Conversion: Basic Theory and Design*, Marrel Dekker, Inc., New York, New York 1984, pp. 1–17.

*Primary Examiner*—Stuart N. Hecker
*Assistant Examiner*—Rajnikant B. Patel

[57] ABSTRACT

With a switching converter that delivers power to a load at a regulated load voltage based upon switch control pulses from a pulse width modulator (PWM), a circuit monitors directly the level of the load voltage and, when it rises to an upper threshold, the circuit generates a feedback signal for the PWM that interrupts its generation of switch control pulses until the load voltage drops to a lower threshold voltage. When the load voltage has dropped to the lower threshold voltage and until it rises to the upper threshold voltage, the circuit generates a feedback signal for the PWM to cause it to produce switch control pulses of a maximum-power pulse width. The circuit may be enabled only in low load conditions and used in connection with the powering of personal computers.

20 Claims, 6 Drawing Sheets

FIG. 1

FIG. 2
NORMAL MODE OPERATION

CONTROLLING PULSE SKIP MODULATION IN POWER CONVERSION

BACKGROUND

This invention relates to controlling switching operations in a switch-mode power converter.

A typical switch-mode power converter, for example, takes a rectified AC signal, steps down the voltage, and delivers a regulated DC signal to a load. When the switch is activated, energy is pumped into the converter and eventually delivered to the load. A feedback signal from regulation circuitry is provided that is generally proportional to the load level and compensates for changes in the load voltage level. The feedback signal is used to alter the time the switch is activated, thus pumping either more or less energy into the converter.

Voltage regulation of the load is typically achieved with a pulse width modulator (PWM) which controls the time period the switch is activated while keeping the switching frequency fixed. As the feedback signal indicates a reduction in the load level, the width of modulating pulses is decreased, thus causing less power to be delivered to the load.

There is a limit as to how far the width of a single pulse can be decreased. Where load level has decreased below a point where further reduction in pulse width is not possible, voltage regulation has been achieved through "burst-mode" techniques that incorporate additional circuitry in the pulse width modulator that, based upon the level of the feedback signal, blanks some of the switch control pulses. Blanking will tend to increase ripple at the output voltage though, which in some applications is not acceptable. The task of controlling ripple is made difficult by the fact that the feedback signal, by virtue of compensation circuitry, does not correspond immediately to changes in the load voltage level, and the gain of the feedback signal is limited and diminishes with increased frequency.

Another issue that becomes important in low load operation is switching losses. There are losses in power associated with the switch turning on and the switch turning off. In low load operation, switching losses become a significant component of power consumption. As such, it is desirable to reduce the number of switching operations.

A general object of the invention is to provide an inexpensive method for controlling the skipping of switching operations to allow a power converter to operate reliably and efficiently at light loads.

SUMMARY

In general, the invention features a circuit that monitors directly the level of the load voltage for a voltage-regulated load powered by a PWM-controlled switching converter. When the load voltage has risen to an upper threshold voltage, and until it drops to a lower threshold, the circuit produces a feedback signal that interrupts the PWM's sending of switch control pulses to the switching converter. In other words, the feedback signal causes PWM pulses to be skipped, and hence the term "skip model" modulation.

Implementations of the invention may include one or more of the following features. When the load voltage level has fallen to the lower threshold and until it rises to the upper threshold, the circuit generates a feedback signal that causes the PWM to modulate switch control pulses of a width that approximates the PWM's operation in maximum-load conditions. The circuit may be enabled only at low-load conditions by a computer-controlled switch or other circuitry. The circuit may be designed and packaged separate from known feedback-signal-generating regulation circuitry, or it may be designed and packaged integrally with the regulation circuitry. The circuit may be used with a switching converter for a computer. The upper threshold voltage level may be the regulated output voltage. Alternatively, the upper and lower threshold may be set so that the regulated voltage is centered therebetween.

One implementation of the circuit includes a switch that turns on at a predetermined gate voltage and circuitry that generates a positive hysteresis voltage at the gate when the switch is on. The gate is directly connected to the load voltage so that when the load voltage reaches the upper threshold, the switch turns on which causes the interruption of the PWM's operation. The addition of the hysteresis voltage at the gate keeps the switch on as the load voltage drops. The switch remains on and the PWM interrupted until the load voltage and hysteresis drops to the gate threshold, at which time the switch turns off and the PWM's operation is no longer interrupted.

Enabling of the circuit in low-load conditions may be accomplished by a computer that is able to determine the load level and generate a signal enabling the circuit when the load level drops below a predetermined level. Alternatively, circuitry may be added that causes the output voltage level to increase as load level decreases, in which case the circuit is enabled when the output voltage level increases to a predetermined level. Further, the circuit may be enabled by sensing load current and enabling the circuit when such current drops below a predetermined level.

Among the advantages of the invention may be one or more of the following. When the load (e.g., an energy-conserving computer) is operated in a reduced-power standby mode, ripple at the load may be precisely managed and switching losses reduced.

Other advantages and features will become apparent from the following description and from the claims.

DETAILED DESCRIPTION OF THE INVENTION

Figure 1:
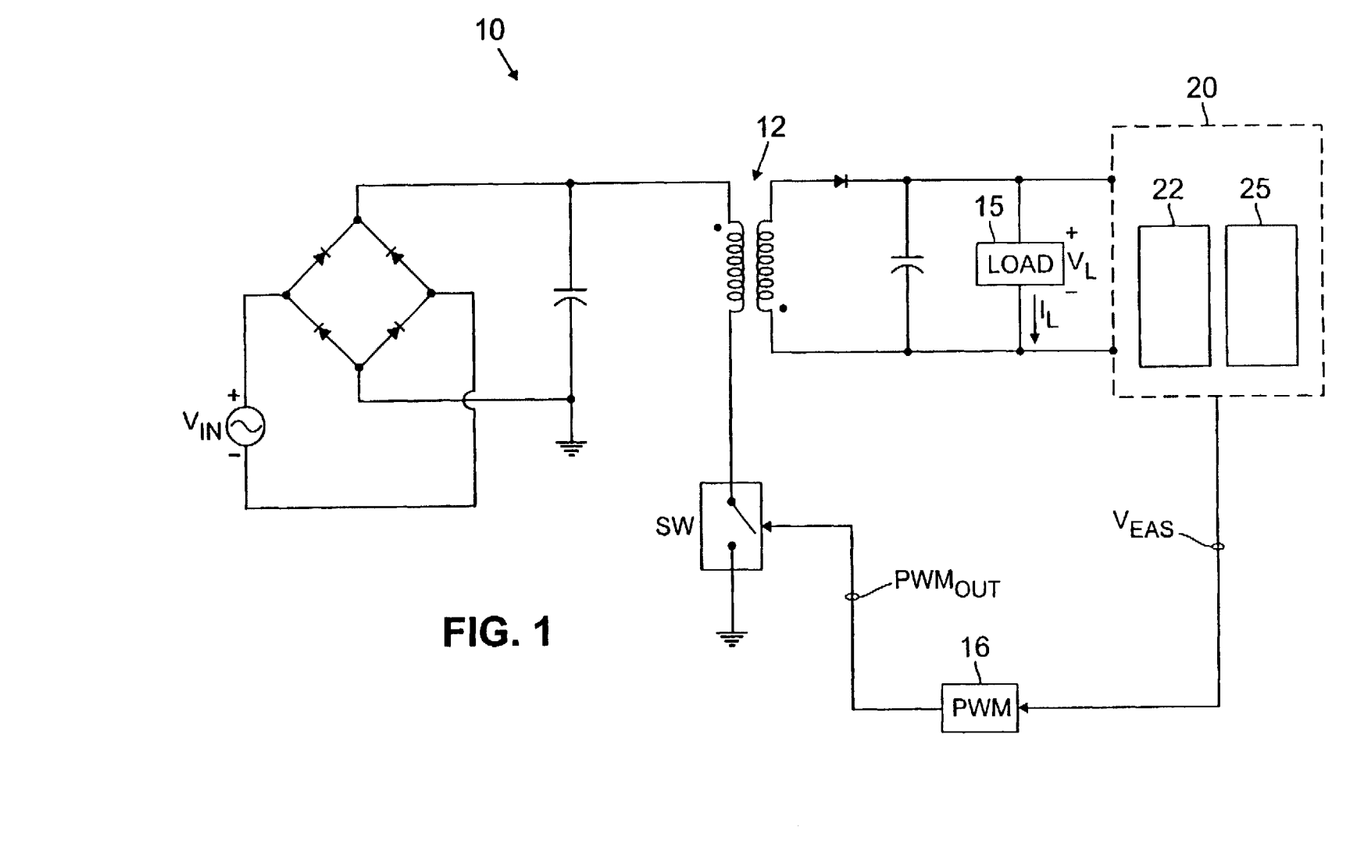
FIG. 1 is a schematic/block diagram of a switch-mode power converter with circuitry of the present invention.

A fly-back switch-mode power converter 10, shown in FIG. 1, receives a 110V/60 HZ AC signal ($V_{IN}$), rectifies it, and converts it to a DC signal ($V_L$) which is regulated at 5 volts, as is required by an electronic device 15 to which power is being supplied.

When switch SW is closed and opened repeatedly, power is delivered to transformer 12 and subsequently forwarded to the load. The power and/or voltage supplied to the load is proportional to the proportion of time that the switch is closed, $SW_{ON}/(SW_{ON}+SW_{OFF})$, and can therefore be controlled in such a way as to regulate the requisite voltage level.

Coupled in parallel to $V_L$ is circuitry 20 that generates an error amplifier signal ($V_{EAS}$) which is fed back to pulse width modulator (PWM) circuitry 16 which controls the switch SW. PWM 16 generates switch control pulses whose width varies with the level of $V_{EAS}$; the higher the level of $V_{EAS}$, the longer the pulse width. The PWM 16 used in this embodiment is designed to receive a $V_{EAS}$ that varies between 0 and 5 volts, 5 volts being indicative of a maximum load condition.

A portion of circuitry 20 is a circuit 22 for generating a $V_{EAS}$ signal while electronic device 15 is operating at normal operating load conditions, and a portion is a circuit 25 for generating a $V_{EAS}$ signal while electronic device 15 is operating in a low-load condition, for example, in standby conditions. Circuit 25 may be a separately designed add-on circuit, or it may be integrally designed with circuit 22. The addition of circuit 25 is what serves to achieve the general object of the present invention.

Figure 2:
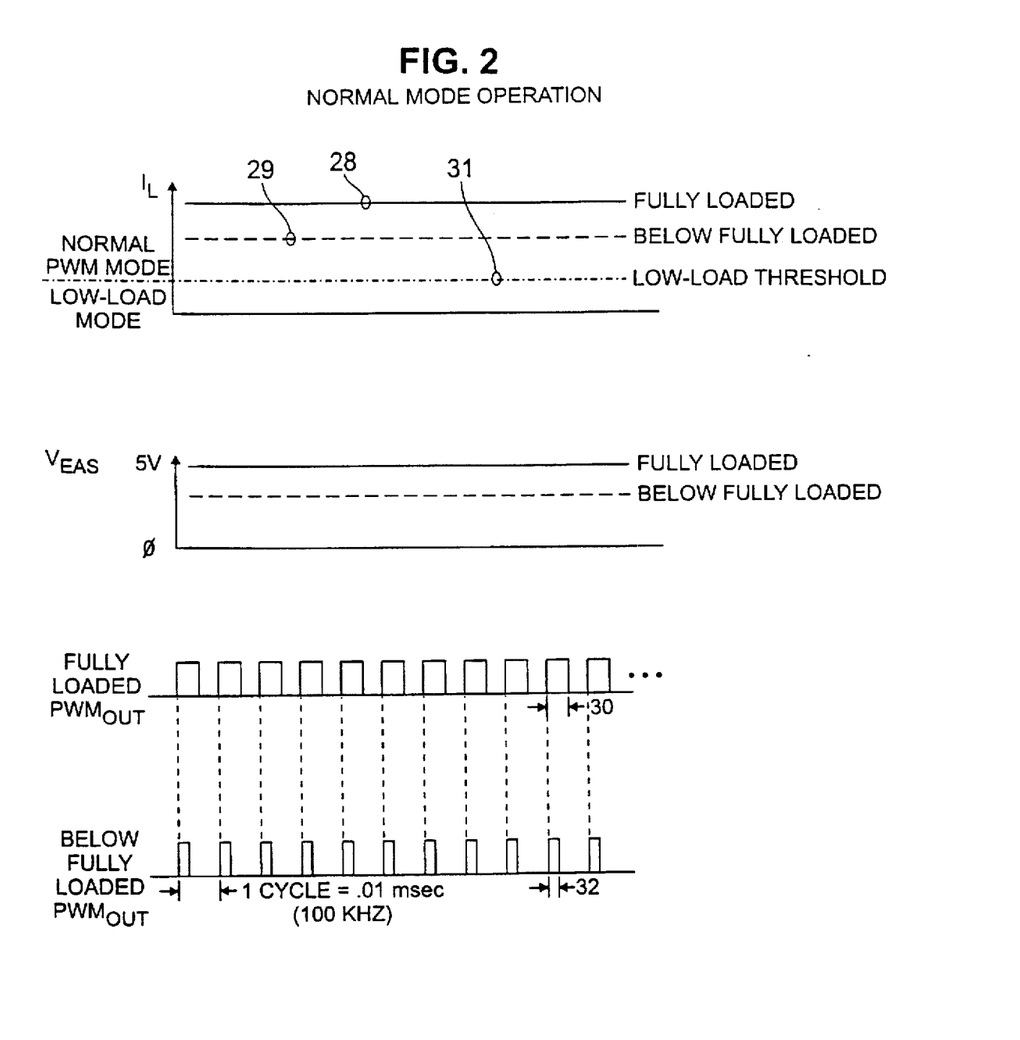
FIG. 2 is timing diagrams of pulse modulation.

Circuitry 20 operates in two modes. Above a predetermined load level, circuitry 20 operates in a normal mode. Below the predetermined level, circuitry 20 operates in a low-load mode. Load level is indicated by the level of current through the load ($I_L$). Normal-mode operation is shown in FIG. 2. $I_L$ is shown at two levels (28 and 29), both of which are above a predetermined level 31. At the higher load level 28, resulting control pulses have a width 30 that is greater than the width 32 of pulses at the lower load level 29. Regardless of the load level though, the frequency of pulses remains constant at 100 KHz.

Figure 3:
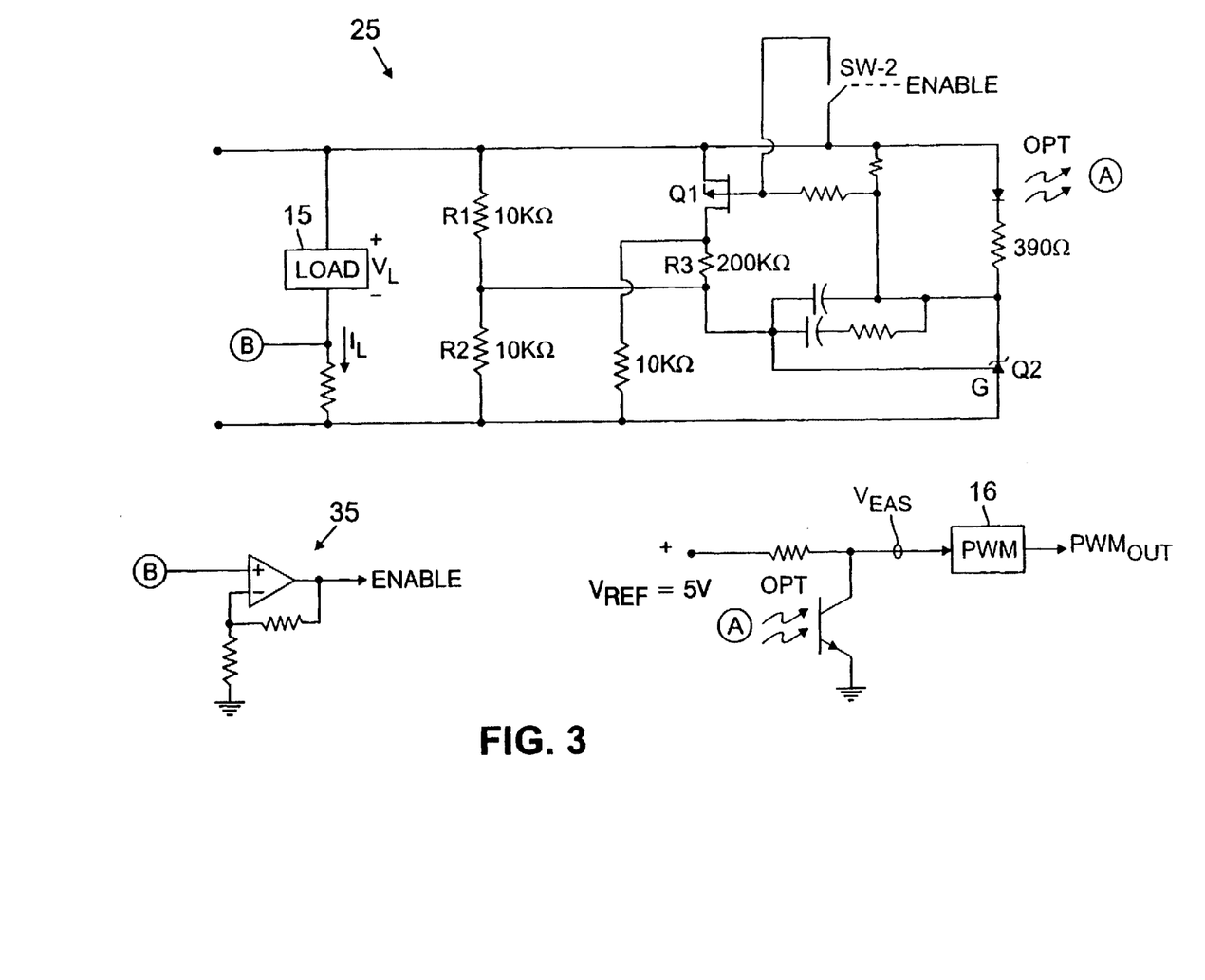
FIG. 3 is a schematic diagram of a circuit of the present invention.

When $I_L$ drops to the predetermined load level, a low-load circuit 25, shown in FIG. 3, is enabled. Low-load circuit 25 is disabled when SW-2 is closed, and enabled when SW-2 is open. A signal generated by a computer which is powered by the converter and which senses load level, switch SW-2 to enable low-load circuit 25. Alternatively, low-load circuit 25 may be enabled by current sensing circuitry 35 that opens switch SW-2. Regardless of how enablement occurs, when low-load circuit 25 is enabled, normal-mode circuit 22 (see FIG. 1) is concurrently disabled. The predetermined load level is selected so that, as the load level is decreasing, the normal-mode circuit 22 is disabled (and the low-mode circuit 25 enabled) at or before the load level where further reduction of the width of pulses generated by the PWM is no longer possible.

Figure 4:
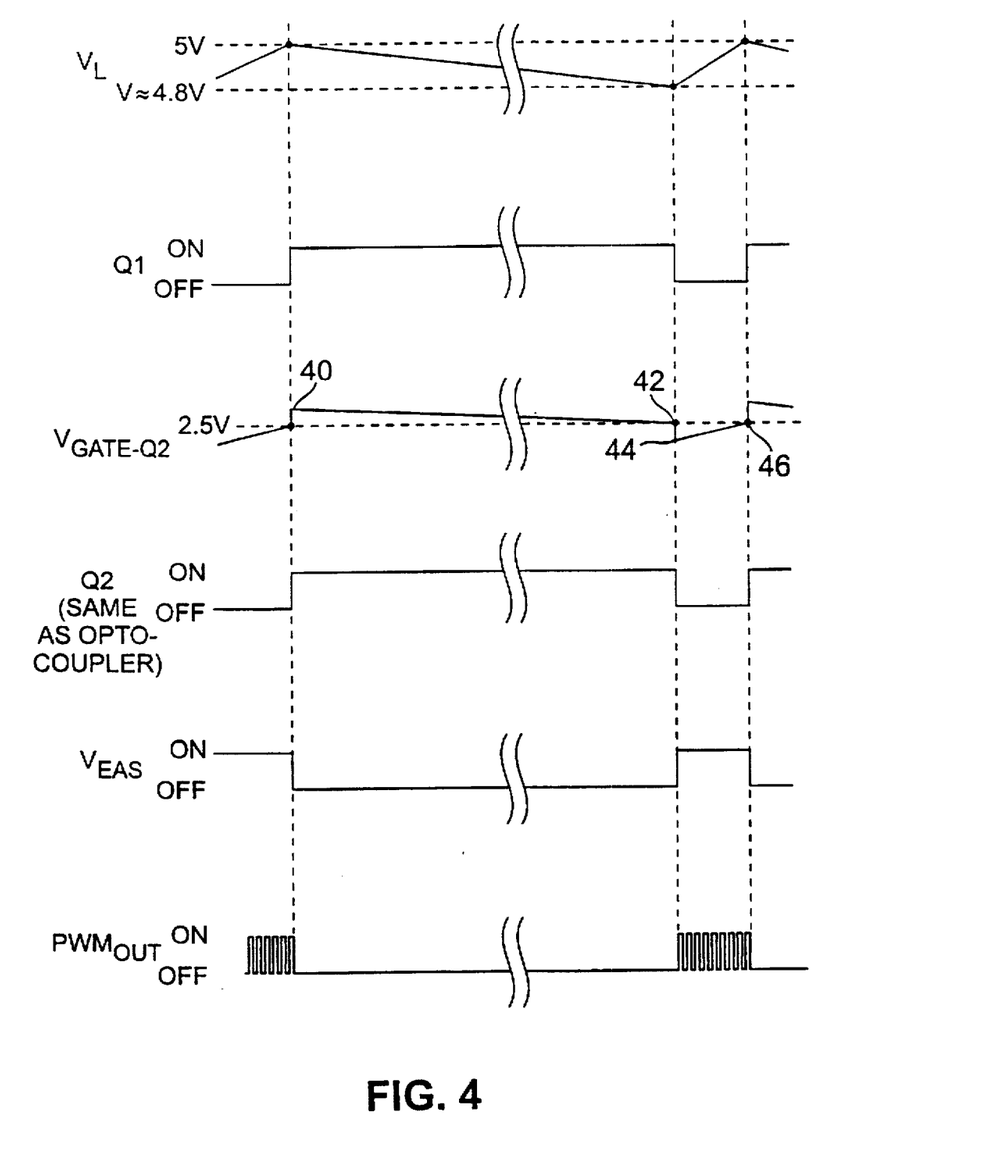
FIG. 4 is timing diagrams.

The opening of switch SW-2 upon the enabling of the low-load circuit causes p-channel field effect transistor (FET) Q1 to be turned on. FET Q1 being turned on creates a positive hysteresis voltage at the gate (G) of TL-431 regulator Q2, as shown in FIG. 4. The hysteresis voltage is created because, with Q1 on, resistor R3 is now in parallel with resistor R1, and thus the load voltage is divided so that a higher percentage of its voltage is across resistor R2. Regulator Q2 in this application acts as a switch and has a triggering threshold of 2.5 volts (half of the regulated voltage level). With FET Q1 off, the voltage division provided by 10 kilo-ohm resistors R1 and R2 causes a voltage level approximating 2.5 volts to be maintained at the gate of regulator Q2. However, with FET Q1 on and by virtue of the resulting positive hysteresis voltage, the voltage at the gate of regulator Q2 jumps slightly above the 2.5 volt threshold of regulator Q2, and consequently turns regulator Q2 on. Regulator Q2 being turned on causes opto-coupler OPT to be turned on, which in turn causes $V_{EAS}$ to go low.

In the low-load mode, $V_{EAS}$ has only two levels; $V_{EAS}$ is either completely on (which in this example is 5 volts given that $V_{REF}$ shown in FIG. 3 is 5 volts) or completely off. This contrasts with operation in the normal mode where $V_{EAS}$ varies in proportion to the load level. Thus, in the low-load mode when $V_{EAS}$ goes low, PWM 16 is completely disabled and will produce no switch control pulses. When PWM 16 is disabled, no power is delivered to transformer 12 (FIG. 1).

During the time that PWM 16 is disabled, $V_L$ will begin to drop. At the same time the voltage at the gate of regulator Q2 will begin to drop. When the gate voltage of regulator Q2 drops to 2.5 volts, regulator Q2 will be turned off. When this occurs, $V_L$ will have dropped approximately 200 millivolts (i.e., to approximately 4.8 volts). Depending on the degree of ripple that can be tolerated at $V_L$, the lower limit of 4.8 volts may be altered by changing the resistance of resistor R3 which alters the level of hysteresis voltage.

Figure 5:
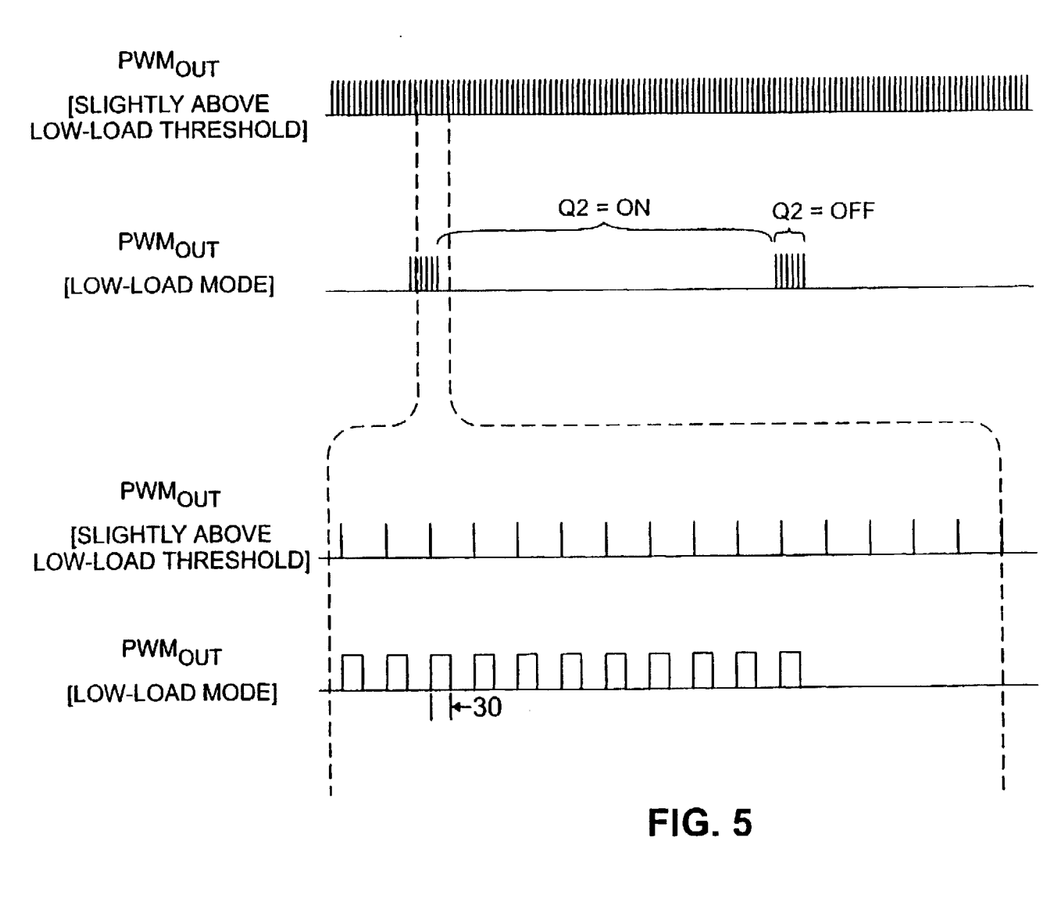
FIG. 5 is timing diagrams of modulated pulses.

When regulator Q2 turns off, opto-coupler OPT also turns off. This causes $V_{EAS}$ to jump immediately to the 5 volt level. PWM 16, in response, begins to produce pulses as if the electronic device 15 were operating at maximum load (see FIG. 2). As such, the pulse width 30 of pulses produced in the low-load mode (see FIG. 5) approximates the width 30 of pulses produced when the electronic device 15 is operating at maximum load (see FIG. 2).

Regulator Q2 and opto-coupler (OPT) being turned off in turn causes FET Q1 to be turned off. FET Q1 being turned off eliminates the hysteresis voltage at the gate of regulator Q2. Thus, the voltage level at the gate jumps further below the 2.5 volt threshold of regulator Q2.

During the time PWM 16 is enabled in the low-load mode, $V_L$ will begin to rise, as will the voltage at the gate of regulator Q2. As is shown but not to scale in FIGS. 4 and 5, the time it takes for the voltage at the gate of regulator Q2 to rise from the lower voltage level (44) to 2.5 volts (46) is much shorter than the time it takes for $V_{GATE-Q2}$ to fall from the higher voltage level (40) to 2.5 volts (42). When the gate voltage of regulator Q2 rises to 2.5 volts causing regulator Q2 to turn off, $V_L$ will have risen back to the regulated voltage level of 5.0 volts. Upon this occurring, the circuit 25 repeats the operation described above. Thus, the ripple at $V_L$ is managed so that $V_L$ oscillates between 5.0 and 4.8 volts. Alternatively, circuit 25 could be altered so that the ripple oscillation is centered at the regulation point of 5.0 volts. Also, owing to the greater width of pulses in the burst, in comparison to prior art methods, fewer pulses are needed to deliver the same amount of power to the load, and hence switching losses are reduced.

Figure 6:
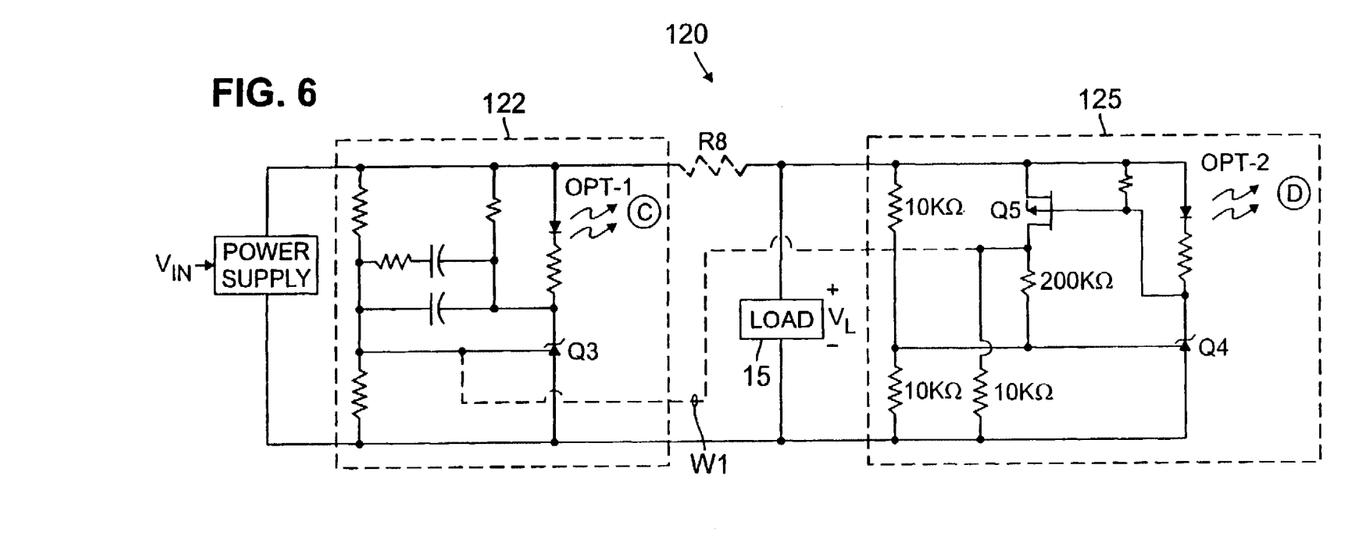
FIG. 6 is a schematic diagram of an alternative circuit of the present invention.

Circuit 120, shown in FIG. 6, illustrates an alternative embodiment of the invention. Circuit 120 includes a low-mode circuit 125 which is similar in operation to circuit 25 of FIG. 3 discussed above. In circuit 120, an increasing load voltage ($V_L$) is created just prior to the load level dropping to the predetermined load level that initiates low-load mode operation. A predetermined $V_L$ increase enables operation in the low-load mode.

Figure 7A:
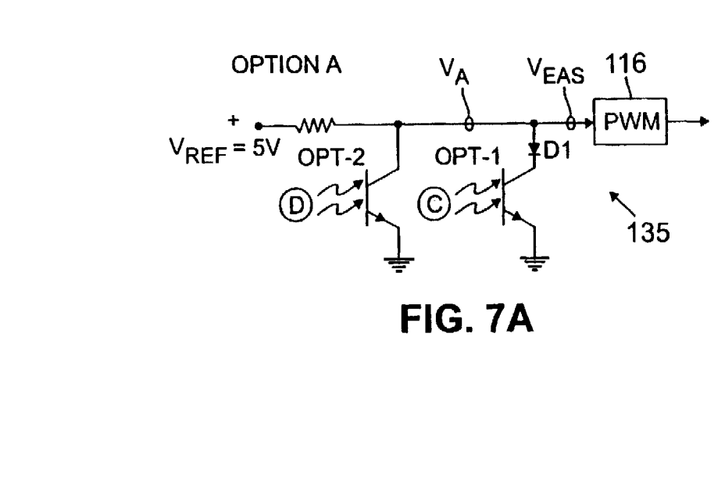
FIG. 7A is a schematic/block diagram of a first option for the circuit of FIG. 6.

Option A of the $V_L$-increase-enabling technique employs both opto-couplers OPT-1 and OPT-2, as well as circuitry 135 (FIG. 7A). Option A does not employ resistor R8 or wire W1, both of which are indicated by dashed lines in FIG. 6.

Above the predetermined low-load threshold, known regulation circuitry 122 produces a $V_{EAS}$ signal that varies in proportion with the load level and compensates for changes in $V_L$, which is regulated at the 5.0 volt level. Diode D1 of circuit 135 is selected to allow $V_{EAS}$ to drop to a minimum level, such as 0.6 volts, and no lower. As the load continues to drop, but $V_{EAS}$ is held at 0.6 volts, more than enough power will be delivered to the load causing $V_L$ to increase until the threshold of regulator Q4 is reached and regulator Q4 and opto-coupler OPT-2 turn on. Opto-coupler OPT-2 being turned on causes $V_A$ and hence $V_{EAS}$ to drop completely low, thus interrupting the sending of pulses from PWM 116 and stopping power from being delivered into the power converter.

In the manner described in connection with circuit 25 of FIG. 3, regulator Q4 and opto-coupler OPT-2 remain on until the gate voltage of regulator Q4 drops back down to regulator Q4's threshold. When Q4's gate voltage has dropped to the threshold, $V_L$ will have dropped to a lower threshold voltage level. When the lower threshold (e.g., 4.8 volts) is met, regulator Q4 and opto-coupler OPT-2 turn off. With OPT-2 off, $V_A$ returns to the 5 volt level and the operation of regulation circuitry 122 is again enabled. At that-time, because $V_L$ is 4.8 volts, regulation circuitry 122 senses an undervoltage condition and thus produces a maximum-power $V_{EAS}$ signal of 5.0 volts, thus causing PWM 116 to produce maximum-pulse-width pulses. Load voltage $V_L$ will then rise until it reaches the regulation level of 5 volts, at which time low-mode circuit 125 takes over and the operation of PWM 116 is interrupted again.

Figure 7B:
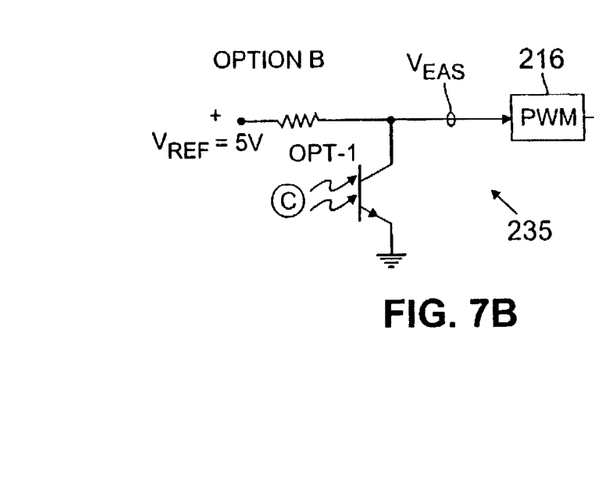
FIG. 7B is a schematic/block diagram of a second option for the circuit of FIG. 6.

Option B of circuit 120 employs resistor R8, wire W1, and circuitry 235 (FIG. 7B). Option B does not use opto-coupler OPT-2, using only opto-coupler OPT-1. The addition of R8 causes load voltage $V_L$ to increase as $I_L$ decreases, and vice-versa. Resistor R8 has a small resistance, such as 25 milli-ohms, so that a change in $I_L$ causes only a small change with $V_L$. Load voltage $V_L$ will, as the load decreases toward the low-load level, continue to increase until the threshold level of regulator Q4 is reached, at which time low-load operation begins. Regulator Q4 being turned on causes p-channel FET Q5 to be turned on. By virtue of wire W1, when FET Q5 is turned on, a voltage approximating $V_L$ (approximately 5 volts) is applied to the gate of regulator Q3. This causes regulator Q3 and opto-coupler OPT-1 to be turned on hard and PWM 216 operation to be interrupted.

Again in the manner described in connection with circuit 25 of FIG. 3, regulator Q4 remains on until the gate voltage of regulator Q4 drops back down to regulator Q4's threshold, at which time regulator Q4 is turned off. When this occurs, FET Q5 is turned off, and regulator Q3 and opto-coupler OPT-1 return to their previous state which causes PWM 216 to produce pulses again. As with option A, the pulses produced will be maximum power pulse width due to the undervoltage condition. Pulses are generated until $V_L$ rises back to the 5.0 volt level, at which time low-mode circuit will cause the interruption of PWM's 116 operation again.

Other embodiments are also within the scope of the claims.

What is claimed is:

1. A control circuit for producing a feedback signal to a pulse width modulator that generates switch control pulses for a switching converter that delivers power to a load at a regulated load voltage level, comprising:

circuitry for monitoring directly the level of the load voltage; and circuitry for generating an interruption feedback signal that, in a low-load mode, causes the pulse width modulator to interrupt the generation of switch control pulses, when the monitored load voltage level has risen to an upper threshold voltage level and until the monitored load voltage level drops to a lower threshold voltage level; and in a normal mode, allows the pulse width modulator to modulate the width of switch control pulses without interrupting the generation of switch control pulses.

2. The control circuit of claim 1 further comprising circuitry for generating a fully loaded feedback signal that causes the pulse width modulator to generate switch control pulses of a width approximately equal to a width generated when the load is at a fully loaded load level, when the monitored load voltage level has dropped to the lower threshold voltage level and until the monitored load voltage level rises to the upper threshold voltage level.

3. The control circuit of claim 2 wherein:

the upper threshold voltage level is the regulated load voltage level; and the lower threshold voltage level is below the regulated load voltage level by a predetermined voltage amount.

4. The control circuit of claim 2 wherein:

the upper threshold voltage level is above the regulated load voltage level by a predetermined voltage amount; and the lower threshold voltage level is below the regulated load voltage level by the predetermined voltage amount, wherein the oscillation of the load voltage level is centered about the regulated load voltage level.

5. The control circuit of claim 1 further comprising:

circuitry for monitoring the level of the load; and a switch for enabling the control circuit when the monitored load level is less than a predetermined load level.

6. The control circuit of claim 5 wherein, while the control circuit is enabled by the switch, normal operating mode control circuitry that generates a feedback signal that is approximately proportional to the load level is disabled.

7. The control circuit of claim 5 wherein:

the load is being drawn by a computer that comprises the load-level monitoring circuitry; and the computer activates the switch for enabling the circuit when the monitored load the computer is drawing is below the predetermined load level.

8. The control circuit of claim 5 wherein:

the load-level monitoring circuitry monitors the level of load current; and the switch enables the control circuit when the monitored load current is below a predetermined load current level.

9. The control circuit of claim 5 wherein:

the control circuit further comprises a resistor connected in series with the load and the switching converter, the resistor for increasing the load voltage level as the load level decreases;

the load-level monitoring circuitry monitors the load voltage level; and the switch enables the control circuit when the monitored load voltage level is above a predetermined load voltage level.

10. The control circuit of claim 5 wherein:

the control circuit further comprises a diode that, at a load level above the predetermined level, stops the reduction of pulse width as the load further decreases, thereby causing an increase in the load voltage as the load level decreases;

the load-level monitoring circuitry monitors the load voltage level; and the switch enables the circuit when the monitored load voltage level is above a predetermined load voltage level.

11. The control circuit of claim 1 further comprising:

an interruption switch having a gate input and activated when the voltage level at the gate input is above a predetermined voltage level, the interruption switch electrically connected so that it is first activated when the load voltage level has risen to the upper threshold voltage level;

circuitry for generating a positive hysteresis that increases the voltage level at the gate input when the interruption switch is activated, so that when the voltage level at the gate input has dropped back to the predetermined voltage level, the load voltage level will have dropped to the lower threshold voltage level.

12. The control circuit of claim 11 further comprising circuitry for generating a fully loaded feedback signal that causes the pulse width modulator to generate switch control pulses of a width approximately equal to a width generated when the load is at a fully loaded load level, when the monitored load voltage level has dropped to the lower threshold voltage level and until the monitored load voltage level rises to the upper threshold voltage level.

13. The control circuit of claim 11 further comprising:

circuitry for monitoring the level of the load; and a switch for enabling the control circuit when the monitored load level is below a predetermined load level.

14. A switching converter that delivers power to a load at a regulated load voltage level, comprising:

a pulse width modulator for modulating the width of switch control pulses that govern the amount of power delivered to the load;

circuitry for monitoring directly the level of the load voltage; and circuitry for generating a feedback signal to the pulse width modulator, the generating circuitry comprising circuitry for generating an interruption feedback signal when the monitored load voltage level has risen to an upper threshold voltage level and until the monitored load voltage level drops to a lower threshold voltage level, the pulse width modulator being responsive to the interruption feedback signal for stopping the modulation of switch control pulses.

15. The switching converter of claim 14 wherein the feedback-signal-generating circuitry further comprises circuitry for generating a fully loaded feedback signal that causes the pulse width modulator to generate switch control pulses of a width approximately equal to a width generated when the load is at a fully loaded load level, when the monitored load voltage level has dropped to the lower threshold voltage level and until the monitored load voltage level rises to the upper threshold voltage level.

16. The switching converter of claim 15 wherein:

the feedback-signal-generating circuitry further comprises circuitry for generating a load-proportional feedback signal that is approximately proportional to the level of the load;

the switching converter further comprises circuitry for monitoring the level of the load and a switch for disabling the load-proportional-feedback-signal-generating circuitry and enabling the interruption-feedback-signal-generating circuitry and the fully loaded-feedback-signal-generating circuitry, when the monitored load is below a predetermined load level.

17. A computer powered by a switching converter at a regulated load voltage level, comprising:

a pulse width modulator for modulating the width of switch control pulses that govern the amount of power delivered to the load;

circuitry for monitoring directly the level of the load voltage; and circuitry for generating a feedback signal to the pulse width modulator, the generating circuitry comprising circuitry for generating an interruption feedback signal when the monitored load voltage level has risen to an upper threshold voltage level and until the monitored load voltage level drops to a lower threshold voltage level, the pulse width modulator being responsive to the interruption feedback signal for stopping the modulation of switch control pulses.

18. The computer of claim 17 wherein the feedback-signal-generating circuitry further comprises circuitry for generating a fully loaded feedback signal that causes the pulse width modulator to generate switch control pulses of a width approximately equal to a width generated when the load is at a fully loaded load level, when the monitored load voltage level has dropped to the lower threshold voltage level and until the monitored load voltage level rises to the upper threshold voltage level.

19. The computer of claim 18 wherein:

the feedback-signal-generating circuitry further comprises circuitry for generating a load-proportional feedback signal that is approximately proportional to the level of the load;

the switching converter further comprises circuitry for monitoring the level of the load and a switch for disabling the load-proportional-feedback-signal-generating circuitry and enabling the interruption-feedback-signal-generating circuitry and the fully loaded-feedback-signal-generating circuitry, when the monitored load is below a predetermined load level.

20. A method for producing a feedback signal to a pulse width modulator that generates switch control pulses for a switching converter that delivers power to a load at regulated load voltage level, comprising:

monitoring directly the level of the load voltage; and monitoring the level of the load;

when the monitored level of the load is above a predetermined load level, producing a variable feedback signal that is approximately proportional to the load level and compensates for changes in the load voltage level, and causes the pulse width modulator to output width modulated pulses in dependence on said variable feedback signal;

when the monitored level of the load is below the predetermined load level, producing an interruption feedback signal that causes the pulse width modulator to interrupt the generation of switch control pulses when the load voltage level has risen to an upper threshold voltage level and until the load voltage level drops to a lower threshold voltage level, and producing a fully loaded feedback signal that causes the pulse width modulator to generate switch control pulses of a width approximately equal to a width generated when the load is at a fully loaded load level when the load voltage level has dropped to the lower threshold voltage level and until the load voltage level rises to the upper threshold voltage level.

* * * * *